United States Patent
Magg et al.

(10) Patent No.: US 10,066,078 B2
(45) Date of Patent: Sep. 4, 2018

(54) CROSS-LINKING OF CARBOXYLATED NITRILE RUBBERS BY MEANS OF CROSS-LINKING SYSTEMS CONTAINING RESOL

(71) Applicant: LANXESS Deutschland GmbH, Cologne (DE)

(72) Inventors: Hans Magg, Kuerten (DE); Achim Welle, Leverkusen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 14/760,034

(22) PCT Filed: Jan. 16, 2014

(86) PCT No.: PCT/EP2014/050770
§ 371 (c)(1),
(2) Date: Jul. 9, 2015

(87) PCT Pub. No.: WO2014/111451
PCT Pub. Date: Jul. 24, 2014

(65) Prior Publication Data
US 2015/0337124 A1    Nov. 26, 2015

(30) Foreign Application Priority Data
Jan. 21, 2013 (EP) .................................. 13152079

(51) Int. Cl.
C08L 13/00 (2006.01)
C08K 5/13 (2006.01)
C08J 3/24 (2006.01)
C08K 3/34 (2006.01)
C08K 5/5419 (2006.01)
C08L 61/06 (2006.01)

(52) U.S. Cl.
CPC ............. *C08K 5/13* (2013.01); *C08J 3/247* (2013.01); *C08K 3/34* (2013.01); *C08K 5/5419* (2013.01); *C08L 13/00* (2013.01); *C08L 61/06* (2013.01); *C08J 2313/00* (2013.01); *C08J 2461/10* (2013.01); *C08L 2205/05* (2013.01); *C08L 2312/04* (2013.01)

(58) Field of Classification Search
CPC ............................ C08L 13/00; C08L 2312/04
See application file for complete search history.

(56) References Cited

U.S. PATENT DOCUMENTS

| | | | | |
|---|---|---|---|---|
| 4,952,634 A | * | 8/1990 | Grossman | C08K 5/098 525/190 |
| 5,141,992 A | | 8/1992 | Katoh et al. | |
| 6,207,752 B1 | | 3/2001 | Abraham et al. | |
| 6,737,478 B2 | | 5/2004 | Obrecht et al. | |
| 2002/0161119 A1 | * | 10/2002 | Obrecht | C08L 19/003 525/133 |
| 2003/0134979 A1 | | 7/2003 | Ferrari et al. | |

FOREIGN PATENT DOCUMENTS

| | | |
|---|---|---|
| JP | 2009007442 A2 | 1/2009 |
| JP | 2010106113 A | 5/2010 |
| TW | 240737 B | 9/2001 |
| WO | 2006016699 A1 | 8/2005 |
| WO | 2006016714 A1 | 8/2005 |

OTHER PUBLICATIONS

Brown, H.P. Carboxylic Elastomers, Rubber Chemistry and Technology, 1957, vol. 30, No. 5, pp. 1347-1386, American Chemical Society, Inc., Washington DC, USA, Abstract.
Schneegans, D., et al, "Neue Kunstoff-Kautschuk-Verbunde mit grosem InnovationsPotenzial", GAK Aug. 2007, K & K Composites, vol. 60, , GAK Gummi Fasem Kunstoffe, Ratingen, Germany, pp. 494-499.
Okamatsu, T. et al., "Thermodynamic Work of Adhesion and Peel Adhesion Energy of Dimethoxysilyl-Terminated Polypropylene Oxide/Epoxy Resin System Jointed with Polymeric Substrates", Journal of Applied Polymer Science, vol. 80, 2001, John Wiley & Sons, Inc., Hoboken, NJ, USA, pp. 1920-1930.
Ibarra, L. et al., "Mechanical and Dynamic Properties of Ionic Elastomers Obtained from Carboxylated Nitrile Rubber and Zinc Peroxide", Elastomers and Plastics, KGK Kautschuk Gummi Kunstoffe 53, vol. 7-8/2000, Heidelberg, Germany, pp. 415-418.
Eisenberg, A., "Clustering of Ions in Organic Polymers. A Theoretical Approach", Clustering of Ions, Macromolecules, vol. 3, No. 2, Mar.-Apr. 1970, American Chemical Society, Inc., Washington DC, pp. 147-154.
Michel, W., "Pyrogenic silica as a filler for elastomeric materials", International Polymer Science and Technology, 34, No. 3, 2007, Gummi Fassem Kunstoffe, No. 2, 2007, Ratingen, Germany, p. 98.
International Search Report from International Application No. PCT/EP2014/050770, dated Mar. 7, 2014, 3 pages.
European Search Report from co-pending Application EP13152079 dated Jun. 6, 2013, 2 pages.

* cited by examiner

*Primary Examiner* — Kuo Liang Peng

(57) ABSTRACT

The invention relates to vulcanizable compositions based on carboxylated nitrile rubbers, at least one resol crosslinker, at least one silicatic filler and at least one specific silane, to a process for preparing these vulcanizable compositions, to a process for producing vulcanizates therefrom and to the vulcanizates thus obtained. The vulcanizates feature good mechanical and dynamic properties and an excellent compression set.

18 Claims, 2 Drawing Sheets

Examples 1*, 3*, 6* and 7*
(assignment of the curves to the examples in accordance with numbering on the right-hand edge of the figure)

CROSS-LINKING OF CARBOXYLATED NITRILE RUBBERS BY MEANS OF CROSS-LINKING SYSTEMS CONTAINING RESOL

The invention relates to vulcanizable compositions based on carboxylated nitrile rubbers, resol crosslinkers, mineral fillers and specific additives, to a process for preparing these vulcanizable compositions, to a process for producing vulcanizates therefrom and to the vulcanizates thus obtained.

BACKGROUND INFORMATION

Nitrile rubbers, often also abbreviated to "NBR", are understood to mean rubbers which are co- or terpolymers of at least one α,β-unsaturated nitrile, at least one conjugated diene and optionally one or more further copolymerizable monomers. Hydrogenated nitrile rubbers ("HNBR") are understood to mean corresponding co- or terpolymers in which all or some of the C=C double bonds of the copolymerized diene units have been hydrogenated.

For many years, both NBR and HNBR have occupied an established position in the specialty elastomers sector. They possess an excellent profile of properties in the form of excellent oil resistance, good heat stability, excellent resistance to ozone and chemicals, the latter being even more pronounced its the case of HNBR than in the case of NBR, NBR and HNBR also have very good mechanical and performance properties. For this reason, they are widely used in a wide variety of different fields of use, and are used, for example, for production of gaskets, hoses, belts and damping elements in the automotive sector, and also for stators, well seals and valve seals in the oil production sector, and also for numerous parts in the electrical industry, mechanical engineering and shipbuilding. A multitude of different types are commercially available, and these feature, according to the application sector, different monomers, molecular weights, polydispersities and mechanical and physical properties. As well as the standard types, there is increasing demand particularly for specialty types featuring contents of specific termonomers or particular functionalizations.

The market for carboxylated nitrile rubber (also referred to in abbreviated form as "XNBR"), a terpolymer based on at least one α,β-unsaturated nitrile, at least one conjugated diene and at least one monomer containing carboxyl groups, in the case of industrial rubber articles is traditionally in the fields of industrial drive technology, conveying technology, the textile industry, seals in the automotive and industrial sectors, and other specialty applications.

The particular properties of XNBR, such as
very low abrasion and good wear resistance,
excellent vulcanizate properties in relation to strength and stress values,
excellent binding to polar substrates as a result of a possible reaction of the substrate with the carboxyl group of the termonomer and
hydrophilicity, which is likewise attributable to the repeating units of the termonomer containing carboxyl groups,
have for many years enabled coverage of some important fields of use by XNBR.

However, there are limits to wider diversification, firstly resulting from the higher raw material cost of XNBR compared to NBR, and secondly resulting from the hitherto unavoidable use of a crosslinking system composed of metal oxide and a standard sulphur system, in order to obtain vulcanizates with a useable profile of properties. Metal oxides such as, more particularly, zinc oxide, however, are environmentally toxic substances and therefore undesirable in principle.

The crosslinking system composed of metal oxide and sulphur or a sulphur donor enables the vulcanization involving the carboxyl groups in the termonomer repeating units and the double bond in the polymer chain, but processing reliability often does not meet the demands of modern operation, and the handling of the vulcanizable mixture is difficult and may be associated with additional costs, and thermal stability, especially in relation to compression set properties, and resistance to heat ageing are much lower than in the case of nitrite rubber, particularly at high temperatures, because of the metal oxide used.

The preferred use of a combination of zinc oxide and sulphur as a crosslinking system for XNBR is described in Rubber Chemistry and Technology 30 (1957), 1347. A reaction, referred to in Macromolecules, Vol. 3, No. 2, 147 (1970) as "cluster-like" crosslinking, of the dispersed zinc oxide particles with the carboxyl groups of the repeat termonomer units in the XNBR was recognized as the essential cause of many of the excellent properties mentioned, but also leads to the abovementioned problems.

In Kautschuk, Gummi, Kunststoffe 53, 415 (2000), it is stated that a certain improvement in relation to processing is enabled through use of zinc peroxide rather than zinc oxide. However, this variant does not constitute a satisfactory solution overall because of the handling and availability problems associated with this product, and the persistent weakness in relation to the vulcanizate properties.

There has therefore been a search for solutions to the problem which do not need metal oxide as part of the crosslinking system.

There have been different approaches to this in the past. Examples include crosslinking systems based on diamines, diepoxides (diglycidyl ethers of bisphenol A), as used in the manufacture of epoxy resins, carbodiimides, blocked isocyanates and, as described in Journal of Applied Polymer Science, 80, 1925 (2001), thiophosphoryl polysulphides. However, all these processes work in one way, either through reaction with the carboxyl group of the termonomer or through reaction with the double bond of the conjugated diene monomer, show disadvantages of various kinds, and have therefore remained without any great significance in industrial practice.

As detailed in GAK August 2007, volume 60, p. 494ff. by D. Schneegans, R. Gattringer and R. Bauer, only the use of peroxides in "2K technology" has gained a certain significance.

The book "Vulkanisation & Vulkanisationshilfsmittel" [Vulcanization & Vulcanization Aids] by Werner Hofmann, as early as in the 1965 edition, mentioned resin crosslinking for carboxylated nitrile rubbers. There are no known further developments and publications with the aim of introducing this resin crosslinking into industrial practice.

It was thus an object of the present invention to provide vulcanizable mixtures based on nitrile rubbers containing carboxyl groups, which have sufficient processing reliability in the course of processing, are thus easily to handle, and additionally have high thermal stability, especially in relation to compression set properties and resistance to heat ageing.

SUMMARY

This object was achieved through the use of a resol as a crosslinker in the presence of at least one silicatic filler and at least one specific silane.

DESCRIPTION OF THE EMBODIMENTS

Figure 1:
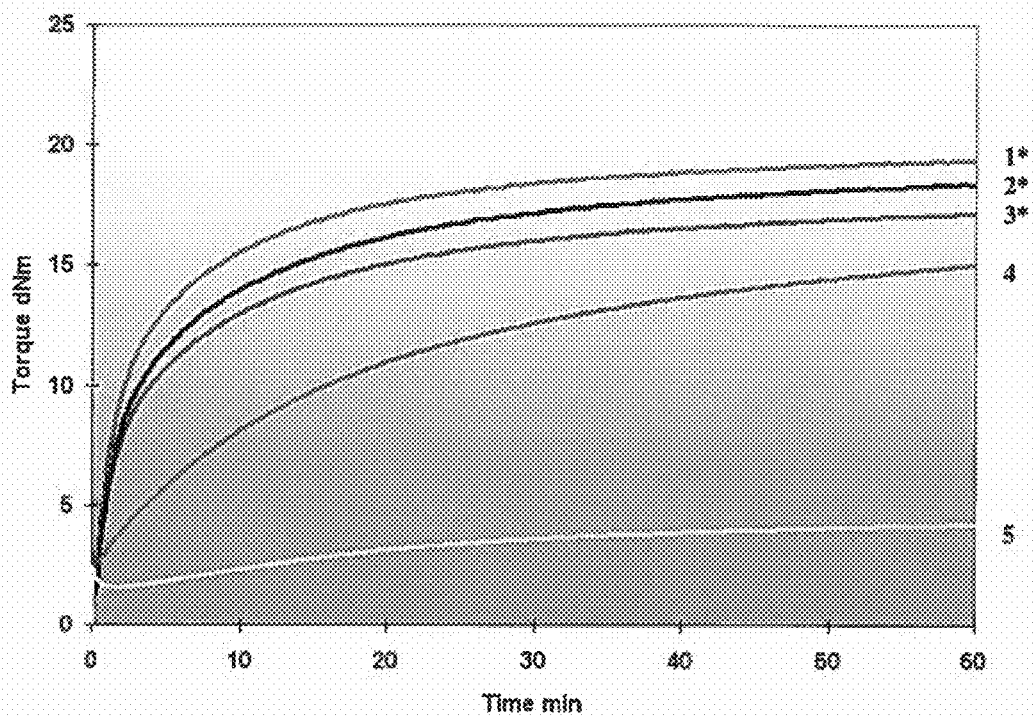
FIGS. 1 and 2 show mixing torque as a function of time for inventive examples versus comparative examples.

The invention thus provides vulcanizable compositions comprising
(1) a nitrile rubber having repeating units of at least one conjugated diene, at least one α,β-unsaturated nitrile and at least one copolymerizable termonomer containing carboxyl groups,
(2) at least one resol,
(3) at least one silicatic filler and at least one silane of the general formula (I)

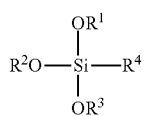

in which
R$^1$, R$^2$ and R$^3$ are the same or different and are each straight-chain or branched C$_1$-C$_{25}$-alkyl radicals or R$^4$—C(=O)— where R$^4$ is straight-chain or branched C$_1$-C$_{25}$-alkyl, and
R$^4$ represents straight-chain or branched C$_1$-C$_{14}$-alkyl radicals being saturated, or one or more times unsaturated and having no, one, two or more substituents selected from vinyl, —SH, substituted or unsubstituted phenyl, methacryloyloxy and isocyanato, or is —R$^5$—(S)$_x$—R$^5$—Si(OR$^1$)(OR$^2$)(OR$^3$) in which R$^1$, R$^2$ and R$^3$ are the same or different and are each as defined in formula (I), R$^5$ is a straight-chain or branched C$_1$-C$_{14}$-alkylene radical and x is a number from 1 to 8,
or alternatively a silicatic filler already modified with a silane.

The invention further provides a process for preparing these vulcanizable mixtures by mixing components (1), (2) and (3).

The invention further provides a process for producing vulcanizates, by subjecting the vulcanizable mixture to vulcanization, preferably at elevated temperature.

The invention further provides vulcanizates obtainable by vulcanizing the inventive mixture.

Advantages

The inventive vulcanizable compositions are notable, compared to compositions based on zinc oxide/sulphur crosslinker systems, for a distinct improvement in processing characteristics. In addition, the vulcanizates obtained by vulcanization from the inventive vulcanizable compositions, on the one hand, exhibit the profile of properties of the products obtained by zinc oxide/sulphur crosslinking, to the extent that it is positive, and, on the other hand, they additionally have significantly better compression set properties, i.e. a lower compression set.

Compared to the crosslinking system composed of zinc oxides and sulphur-based crosslinkers customary to date, the use of the resols as crosslinkers in combination with a silane and the silicatic filler offers a number of advantages with regard to process technology, to processing characteristics, and to the properties of the vulcanizates produced therefrom in the form of a wide variety of different rubber articles:

Raw materials to be used: The vulcanizable compositions according to the present invention are notable in that the use of environmentally harmful crosslinking agents such as zinc oxide, and additionally the use of sulphur or sulphur-donating compounds as part of the crosslinker system, is no longer required. The use of resols results in formation of exclusively stable covalent crosslinking bridges.

Process technology: Mixing viscosity is reduced by up to 30%. This significantly improves the flowability of the mixture. By means of the Rheovulkameter test at 180° C., it was possible to determine that the flowability has improved by up to 100%. The sheets produced from the mixture of the inventive compositions are smoother, and die swell and also calendering shrinkage are lower. The mixtures are thus suitable for the production of moulded articles via an injection moulding process. Extrusion, for instance for hoses, and processing on a calender or a roller head system for films and fabric coverage, is likewise improved. These advantages lead to a significant cost advantage, which can be utilized by any user according to the conditions.

Mixing logistics: Mixtures made vulcanizable with zinc oxide according to the prior art are often only of very limited storage stability. If zinc peroxide is used for improvement, it is even necessary to exercise particular caution. The inventive vulcanizable compositions, in contrast, exhibit a distinct improvement in storage stability. Conditions such as, for example, vulcanization tests after storage at 40° C. for three days, corresponding to a shelf life of about 10 days at room temperature, can be fulfilled efficiently in the case of sensible compounding. As a result, in critical cases, it is possible to improve production planning and reduce the amount of mixtures to be discarded as a result of excessively long storage.

Vulcanizate properties: Stress-strain properties: High stress values for a given hardness are one of the essential properties of elastomers based on nitrile rubbers containing carboxyl groups. These properties are achieved according to the prior art either only in the case of polymers with a high carboxyl group content, or with the consequence that the unavoidable "cluster-like" crosslinking of zinc oxide with the carboxyl groups shows low resistance to relaxation under stress. Therefore, vulcanizates crosslinked with zinc oxide/sulphur and based on nitrile rubbers containing carboxyl groups are customary only in special cases as a sealing material for current industrial requirements. When the inventive mixtures are used, in contrast, the carboxyl group content can be selected within a much wider range. Nitrile rubbers which contain carboxyl groups and have been crosslinked with resol in the presence of silane and silicatic filler lead, even in the case of very low carboxyl group contents of only 1% or less, to vulcanizates having excellent properties and especially compression sets of approx. 35% under prolonged stress for 340 h/100° C. This value is only about half of the value which is achieved with a zinc oxide/sulphur-crosslinked vulcanizate.

Vulcanizate properties—low-temperature/swelling characteristics: The crosslinking according to the prior art with the zinc oxide/sulphur combination achieves the desired vulcanizate properties only with polymers having a high carboxyl group content and correspondingly relatively low acrylonitrile content. In order to achieve adequate low-temperature properties as in the case of a copolymer with, for example, 33% acrylonitrile, the acrylonitrile content has to be adjusted, for example, to about 28%. This results in higher swelling in nonpolar media compared to nitrile rubber types with 33% acrylonitrile. Since, as described above, vulcanizates with excellent mechanical properties within the context of the typical XNBR property profile are obtained even at only very low carboxyl group contents, it follows that the acrylonitrile content is/can remain high and hence, in contrast to the vulcanizates of the prior art, excellent swelling properties still exist with a glass transition temperature which remains adequate.

In addition to the advantages mentioned above, the positive "dual" effect of the crosslinking for the zinc oxide/sulphur crosslinking system is still maintained. With use of the resol, there is both crosslinking via the double bonds in the main polymer chain of the carboxylated nitrile rubber to give oxacyclohexane derivatives, and via the carboxyl groups through esterification with the hydroxyl groups of the resol and via the α-hydrogen atoms to the nitrile groups to give ethers. Since the resols are at least difunctional, this forms covalent crosslinking bridges which are more thermally and oxidatively stable than ZnO clusters and sulphur bridges. Compared to conventional crosslinking with ZnO/sulphur systems, the vulcanization of the inventive mixtures gives rise to vulcanizates with better stability—for example in relation to compression set at relatively high temperatures. Since the thermooxidative stability is determined essentially by the double bonds in the polymer chain, this is at the level of the standard nitrile rubber vulcanizates.

The fact that these improvements can be achieved in a vulcanizable mixture also comprising a silicatic filler as well as the resol as a crosslinker is surprising, since the use of silicatic fillers can lead to complex conditions, since not only the desired interaction of the resol with the carboxylic acid but also an unwanted interaction of the resol with the silica in the form of unwanted grafting of the resol and a resultant deactivation of the resol can occur. Moreover, an interaction of the silica with the XNBR via hydrogen bonds can also lead to unwanted effects. Through addition of the specific silane, however, it is possible to avoid these unwanted side effects.

Nitrile Rubbers Containing Carboxyl Groups (Component 1):

The nitrile rubbers containing carboxyl groups which are used in the inventive vulcanizable composition are terpolymers having repeating units derived from at least one conjugated diene, at least one α,β-unsaturated nitrile and at least one copolymerizable termonomer containing carboxyl groups. They are also abbreviated to "XNBR" in the context of this application.

Any conjugated diene can be used. Preference is given to using ($C_4$-$C_6$) conjugated dienes. Particular preference is given to 1,2-butadiene, 1,3-butadiene, isoprene, 2,3-dimethylbutadiene, piperylene or mixtures thereof. Especially preferred are 1,3-butadiene and isoprene or mixtures thereof. Even more preferred is 1,3-butadiene.

The α,β-unsaturated nitrile used may be any known α,β-unsaturated nitrile, preference being given to ($C_3$-$C_5$)-α,β-unsaturated nitriles such as acrylonitrile, methacrylonitrile, ethacrylonitrile or mixtures thereof. Particular preference is given to acrylonitrile.

Preferably, the nitrile rubber containing carboxyl groups contains repeating units derived from at least one ($C_4$-$C_6$) conjugated diene, preferably 1,2-butadiene, 1,3-butadiene, isoprene, 2,3-dimethylbutadiene, piperylene or mixtures thereof, and repeating units of at least one ($C_3$-$C_5$)-α,β-unsaturated nitrile, preferably acrylonitrile, methacrylonitrile, ethacrylonitrile or mixtures thereof.

The copolymerizable termonomers containing carboxyl groups used may be α,β-unsaturated monocarboxylic acids, α,β-unsaturated dicarboxylic acids, anhydrides of α,β-unsaturated dicarboxylic acids and monoesters of α,β-unsaturated dicarboxylic acids.

The α,β-unsaturated monocarboxylic acids used may preferably be acrylic acid and methacrylic acid.

Preferred α,β-unsaturated dicarboxylic acids are maleic acid, fumaric acid, crotonic acid, itaconic acid, citraconic acid and mesaconic acid.

It is additionally possible to use anhydrides α,β-unsaturated dicarboxylic acids, preferably maleic anhydride, itaconic anhydride, citraconic anhydride and mesaconic anhydride.

It is additionally possible to use monoesters of α,β-unsaturated dicarboxylic acids.

These monoesters of α,β-unsaturated dicarboxylic acids may, for example, be alkyl, preferably $C_1$-$C_{10}$-alkyl, especially ethyl, n-propyl, isopropyl, n-butyl, tert-butyl, n-pentyl or n-hexyl, alkoxyalkyl, preferably $C_2$-$C_{12}$-alkoxyalkyl, more preferably $C_3$-$C_8$-alkoxyalkyl, hydroxyalkyl, preferably $C_1$-$C_{12}$-hydroxyalkyl-, more preferably $C_2$-$C_8$-hydroxyalkyl, cycloalkyl, preferably $C_5$-$C_{12}$-cycloalkyl, more preferably $C_6$-$C_{12}$-cycloalkyl, alkylcycloalkyl, preferably $C_6$-$C_{12}$-alkylcycloalkyl, more preferably $C_7$-$C_{10}$-alkylcycloalkyl, aryl, preferably $C_6$-$C_{14}$-aryl, monoesters.

Examples of α,β-unsaturated dicarboxylic monoesters include monoalkyl maleates, preferably monomethyl maleate, monoethyl maleate, monopropyl maleate and mono-n-butyl maleate;

monocycloalkyl maleates, preferably monocyclopentyl maleate, monocyclohexyl maleate and monocycloheptyl maleate;

monoalkylcycloalkyl maleates, preferably monomethylcyclopentyl maleate and monoethylcyclohexyl maleate;

monoaryl maleates, preferably monophenyl maleate;

monobenzyl maleates, preferably monobenzyl maleate;

monoalkyl fumarates, preferably monomethyl fumarate, monoethyl fumarate, monopropyl fumarate and mono-n-butyl fumarate;

monocycloalkyl fumarates, preferably monocyclopentyl fumarate, monocyclohexyl fumarate and monocycloheptyl fumarate;

monoalkylcycloalkyl fumarates, preferably monomethylcyclopentyl fumarate and monoethylcyclohexyl fumarate;

monoaryl fumarates, preferably monophenyl fumarate;

monobenzyl fumarates, preferably monobenzyl fumarate;

monoalkyl citraconates, preferably monomethyl citraconate, monoethyl citraconate, monopropyl citraconate and mono-n-butyl citraconate;

monocycloalkyl citraconates, preferably monocyclopentyl citraconate, monocyclohexyl citraconate and monocycloheptyl citraconate;

monoalkylcycloalkyl citraconates, preferably monomethylcyclopentyl citraconate and monoethylcyclohexyl citraconate;

monoaryl citraconates, preferably monophenyl citraconate;

monobenzyl citraconates, preferably monobenzyl citraconate;

monoalkyl itaconates, preferably monomethyl itaconate, monoethyl itaconate, monopropyl itaconate and mono-n-butyl itaconate;

monocycloalkyl itaconates, preferably monocyclopentyl itaconate, monocyclohexyl itaconate and monocycloheptyl itaconate;

monoalkylcycloalkyl itaconates, preferably monomethylcyclopentyl itaconate and monoethylcyclohexyl itaconate;

monoaryl itaconates, preferably monophenyl itaconate;

monobenzyl itaconates, preferably monobenzyl itaconate;

monoalkyl mesaconates, preferably monoethyl mesaconate.

The nitrile rubber containing carboxyl groups used in the inventive compositions contains:

repeating units of at least one conjugated diene in amounts of 40 to 89.9% by weight, preferably of 45 to 84.8% by weight, more preferably 49 to 80% by weight, repeating units of at least one unsaturated nitrile in amounts of 10 to 59.9% by weight, preferably of 15 to 54.8% by weight, more preferably of 19 to 50% by weight and repeating units of at least one copolymerizable termonomer containing carboxyl groups in amounts of 0.1 to 20% by weight, preferably 0.2 to 10% by weight, more preferably 1 to 8% by weight be present, where all the repeating units add up to 100% by weight.

Such nitrile rubbers containing carboxyl groups are commercially available, for example under the Krynac® brand from Lanxess Deutschland GmbH (e.g. Krynac® X 750 and Krynac® X 740 with 7% by weight of carboxylic acid monomer; Krynac® X 146 with 1% by weight of carboxylic acid monomer and Krynac® X 160 with 1% by weight of carboxylic acid monomer).

Alternatively, such nitrile rubbers containing carboxyl groups are preparable by methods known to those skilled in the art by terpolymerization in emulsion.

Resol (Component 2):

The inventive composition comprises at least one resol. Typically, the resol used is a resin based on p-alkylphenols. Such resols are obtainable by condensation of the corresponding p-alkylphenols with formaldehyde under basic conditions.

Typically, the resol contains one or more compounds of the general formula (II)

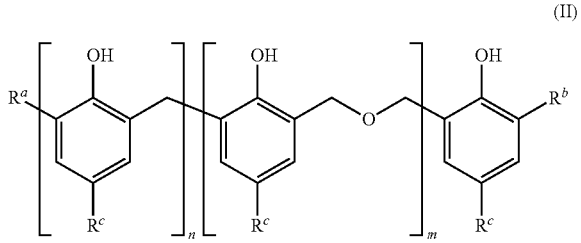

(II)

in which $R^a$ is H, —CH$_3$, —CH$_2$OH or —CH$_2$Br, $R^b$ is —CH$_2$OH or —CH$_2$Br and $R^c$ is a straight-chain or branched C$_1$-C$_{15}$-alkyl radical and n and m are the same or different and are each integers in the range from 0 to 25.

In a preferred embodiment, the resol contains one or more compounds of the general formula (II) its which $R^a$ is H, —CH$_3$, —CH$_2$OH or —CH$_2$Br, $R^b$ is —CH$_2$OH or —CH$_2$Br and $R^c$ is a straight-chain or branched C$_4$-C$_8$-alkyl radical and n and m are the same or different and are each integers in the range from 0 to 15.

Particular preference is given to a resol containing one or more compounds of the general formula (II) in which $R^a$ is H, —CH$_3$, —CH$_2$OH or —CH$_2$Br, $R^b$ is —CH$_2$OH or —CH$_2$Br and $R^c$ is a tert-octyl radical or tert-butyl radical and n and m are the same or different and are each integers in the range from 0 to 15.

Special preference is given to a resol containing one or more compounds of the general formula (II) in which $R^a$ is H or —CH$_2$OH, $R^b$ is —CH$_2$OH and $R^c$ is a straight-chain or branched C$_4$-C$_8$-alkyl radical, especially a tert-octyl radical, and n and m are the same or different and are each integers in the range from 0 to 15.

The commercially available resols contain typically 4-20% by weight of hydroxymethyl groups based on the total weight of the resol. If bromine-modified resols are used, and hence compounds of the general formula (II) in which $R^a$ is —CH$_2$Br are present, the bromine content of the resol is typically in the range of 4-5% by weight based on the total weight of the resol. Resols of the general formula (II) have good compatibility with XNBR and very good homogeneity of dispersibility, since the melting or softening temperature is comparatively low.

If bromine-modified resols are not used, it has been found to be useful in a preferred embodiment to additionally use halogenated additives as activators in the inventive composition, but these most not be derivatives of polyvalent metals. If bromine-modified resols of the formula (II) are used, this addition of halogenated additives is unnecessary.

The resols useable in the inventive compositions are commercially available, for example from Schenectady International, Inc. as SP 1045 or SP 1055.

Silicatic Filler and Silane (Component 3)

The silicatic fillers used in the inventive compositions may be:

natural silicates, synthetic silicates, silicas, glass fibres, glass fibre products or glass microbeads.

The natural silicates may, for example, be kaolin, talc or other naturally occurring silicates.

The synthetic silicates may, for example, be aluminium silicates or alkaline earth metal silicates such as magnesium silicate or calcium silicate, preferably having a BET surface area of 20-400 m$^2$/g and primary particle size of 10-400 nm.

The silicas may, for example, be monosilicic acid (orthosilicic acid) or the more water-deficient condensates thereof, for example disilicic acid (pyrosilicic acid) (HO)$_3$Si—O—Si(OH)$_3$ and trisilicic acid (HO)$_3$Si—O—Si(OH)$_2$—O—Si(OH)$_3$.

In one embodiment, precipitated silicas obtained by precipitation of silicate solutions or fumed silicas obtained by flame hydrolysis of silicon halides are used, the specific BET surface area of which to ISO 9277 is in the range from 5 to 1000 m$^2$/g, preferably 20-500 m$^2$/g and especially in the range of 50-400 m$^2$/g. They typically have primary particle sizes of 10-400 nm. The silicas may optionally also be present as mixed oxides with other metal oxides, such as oxides of Al, Mg, Ca, Ba, Zn, Zr, Ti.

As the case may be, it may also be possible to use hydrophobic silicatic fillers which are described in the literature (W. Mischel; Gummi Fasern Kunststoffe, February 2007, p. 9) or else are commercially available, for example from Evonik Industries AG.

The glass fibre products may, for example, be in mat form or in strand form.

All aforementioned types of silicatic fillers are commercially available.

In the inventive mixtures, at least one silicatic filler and at least one silane of the general formula (I) are used

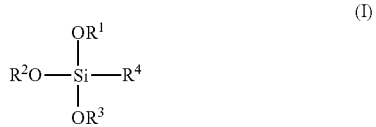

(I)

in which
R$^1$, R$^2$ and R$^3$ are the same or different and are each straight-chain or branched C$_1$-C$_{25}$-alkyl radicals or R$^4$—C(=O)— where R$^4$ is a straight-chain or branched C$_1$-C$_{25}$-alkyl radical, and
R$^4$ represents straight-chain or branched C$_1$-C$_{14}$-alkyl radicals being saturated, or one or more times unsaturated and having no, one, two or more substituents selected from vinyl, —SH, substituted or unsubstituted phenyl, methacryloyloxy and isocyanato, or is —R$^5$—(S)$_x$—R$^5$—Si(OR$^1$)(OR$^2$)(OR$^3$) in which R$^1$, R$^2$ and R$^3$ are the same or different and are each as defined in formula (I), R$^5$ is a straight-chain or branched C$_1$-C$_{14}$-alkylene radical and x is a number from 1 to 8,
or alternatively a silicatic filler already modified with a silane.

In a preferred embodiment, at least one silicatic filler and at least one silane of the general formula (I) are used, in which
R$^1$, R$^2$ and R$^3$ are the same or different and are each straight-chain or branched C$_1$-C$_8$- and especially C$_1$-C$_4$-alkyl radicals, or R$^4$—C(=O)— where R$^4$ is a straight-chain or branched C$_1$-C$_{10}$- and especially C$_1$-C$_8$-alkyl radical, and
R$^4$ represents straight-chain or branched C$_1$-C$_{10}$-alkyl and especially C$_1$-C$_8$-alkyl radicals each being either saturated, or one or more times unsaturated and having no, one, two or more substituents selected from vinyl, —SH, substituted or unsubstituted phenyl, methacryloyloxy and isocyanato, or is —R$^5$—(S)$_x$—R$^5$—Si(OR$^1$)(OR$^2$)(OR$^3$) in which R$^1$, R$^2$ and R$^3$ are the same or different and are each as defined in formula (I), R$^5$ is a straight-chain or branched C$_1$-C$_5$-alkylene radical and x is a number from 1 to 8,
or alternatively a silicatic filler already modified with a silane of the general formula (I) in which R$^1$, R$^2$, R$^3$ and R$^4$ are each as defined above.

In a particularly preferred embodiment, at least one silicatic filler and at least one silane of the general formula (I) are used, in which R$^1$, R$^2$ and R$^3$ are the same or different, especially the same, and are each straight-chain or branched C$_1$-C$_4$-alkyl radicals, especially methyl, ethyl, n-propyl or i-propyl, and
R$^4$ represents straight-chain or branched C$_1$-C$_8$-alkyl radicals being saturated, or one or more times unsaturated and having no, one, two or more substituents selected from vinyl, —SH, substituted or unsubstituted phenyl, methacryloyloxy and isocyanato, or is —R$^5$—(S)$_x$—R$^5$—Si(OR$^1$)(OR$^2$)(OR$^3$) in which R$^1$, R$^2$ and R$^3$ are the same or different and are each as defined in formula (I), R$^5$ is a straight-chain or branched C$_1$-C$_3$-alkylene radical and x is a number from 2 to 5.

Especially preferred silanes are octyltriethoxysilane, vinyltriethoxysilane and bis(triethoxysilylpropyl) oligosulphides, special preference being given to di-, tri- or tetrasulphides (x=2, 3, or 4). Silanes of the general formula (II) are commercially available, for example from the Dynasylan® product range from Evonik Industries AG. Products for the alternative embodiment, i.e. silicatic fillers modified with a silane, are also commercially available, for example individual products from the Coupsil® and Aerosil® product ranges from Evonik Industries AG.

Experiments have shown that silanes having amino or glycidoxy groups as functional groups, for example Dynasylan® GLYEO (3-glycidyloxypropyltriethoxysilane) or Dynasylan® AMEO (3-aminopropyltriethoxysilane), because of their reactivity with the hydroxy methylene group of the resol, are unsuitable for use in the inventive composition. It is essential that the silanes of the general formula (I) do not show any reactivity towards the resol component.

Amounts of the Components in the Inventive Composition:

In a proven embodiment, the inventive composition comprises
(1) 100 parts by weight of a nitrile rubber having repeating units of at least one conjugated diene, at least one α,β-unsaturated nitrile and at least one copolymerizable termonomer containing carboxyl groups,
(2) 1 to 50 parts by weight, preferably 2 to 20 parts by weight and especially 3 to 15 parts by weight of at least one resol
(3) 20 to 100 parts by weight, preferably 20 to 60 parts by weight of at least one silicatic filler and 1 to 20% by weight, preferably 2 to 18% by weight, based on the weight of the silicatic filler, of at least one silane having the general formula (I)

(I)

in which
R$^1$, R$^2$ and R$^3$ are the same or different and are each straight-chain or branched C$_1$-C$_{25}$-alkyl radicals or R$^4$—C(=O)— where R$^4$ is a straight-chain or branched C$_1$-C$_{25}$-alkyl radical, and
R$^4$ represents straight-chain or branched C$_1$-C$_{14}$-alkyl radicals being saturated, or one or more times unsaturated and having no, one, two or more substituents selected from vinyl, —SH, substituted or unsubstituted phenyl, methacryloyloxy and isocyanato, or is —R$^5$—(S)$_x$—R$^5$—Si(OR$^1$)(OR$^2$)(OR$^3$) in which $R^1$, $R^2$ and $R^3$ are the same or different and are each as defined in formula (I), $R^5$ is a straight-chain or branched $C_1$-$C_{14}$-alkylene radical and x is a number from 1 to 8, or alternatively 20 to 125 parts by weight, preferably 20 to 110 parts by weight, of a silicatic filler already modified with a silane, preferably of the general formula (II).

In a particularly proven embodiment, the inventive composition comprises (1) 100 parts by weight of a nitrile rubber having repeating units of at least one conjugated diene, at least one α,β-unsaturated nitrile and at least one copolymerizable termonomer containing carboxyl groups, (2) 1 to 50 parts by weight, preferably 2 to 20 parts by weight and especially 3 to 15 parts by weight of a resol of the general formula (II)

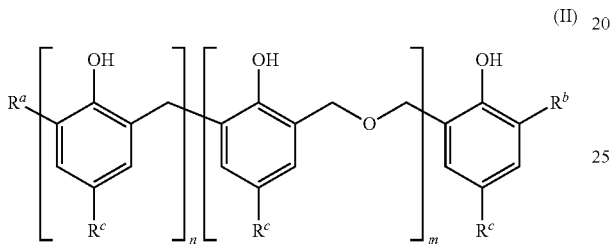

(II)

in which $R^a$ is H, —$CH_3$, —$CH_2OH$ or —$CH_2Br$, $R^b$ is —$CH_2OH$ or —$CH_2Br$ and $R^c$ is a straight-chain or branched $C_1$-$C_{15}$-alkyl radical and n and m are the same or different and are each integers in the range from 0 to 25.

(3) 20 to 100 parts by weight, preferably 20 to 60 parts by weight of a silicatic filler and 1 to 20% by weight, preferably 2 to 18% by weight, based on the weight of the silicatic filler, of a silane having the general formula (I)

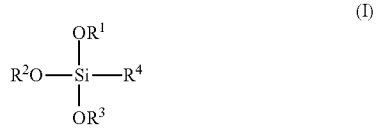

(I)

in which $R^1$, $R^2$ and $R^3$ are the same or different and are each straight-chain or branched $C_1$-$C_{25}$-alkyl radicals or $R^4$—C(=O)— where $R^4$ is a straight-chain or branched $C_1$-$C_{25}$-alkyl radical, and $R^4$ represents straight-chain or branched $C_1$-$C_{14}$-alkyl radicals being saturated, or one or more times unsaturated and having no, one, two or more substituents selected from vinyl, —SH, substituted or unsubstituted phenyl, methacryloyloxy and isocyanato, or is —$R^5$—$(S)_x$—$R^5$—$Si(OR^1)(OR^2)(OR^3)$ in which $R^1$, $R^2$ and $R^3$ are the same or different and are each as defined in formula (I), $R^5$ is a straight-chain or branched $C_1$-$C_{14}$-alkylene radical and x is a number from 1 to 8, or alternatively 20 to 125 parts by weight, preferably 20 to 110 parts by weight, of a silicatic filler already modified with a silane, especially of the general formula (I).

Further Optional Components of Inventive Mixture:

As well as the carboxylated nitrile rubber, the inventive mixture may also comprise further polymers in the form of one or more further rubbers, one or more further thermoplastics or any desired mixtures thereof.

Rubbers:

Further rubbers used may, for example, be one or more of the following:

styrene-butadiene rubber (also abbreviated as SBR)
nitrile rubber (also abbreviated as NBR)
hydrogenated nitrile rubber (also abbreviated as HNBR)
ethylene-vinyl acetate copolymer (also abbreviated as EVM)
ethylene-propylene-diene monomer rubber (also abbreviated as EPDM)
ethylene-acrylate rubber (also abbreviated as AEM)
acrylate rubbers (also abbreviated as ACM)
fluoro rubbers (also abbreviated as FKM)
chloroprene rubbers (also abbreviated as CR)
chlorinated polyethylene (CM)

In this context, it has been found to be useful to use at least 20 parts by weight of the further rubber(s) based on 100 parts by weight of the nitrile rubber component 1).

Thermoplastics:

The thermoplastic polymers used may be all standard thermoplastic polymers.

Typical and suitable thermoplastics are polyvinyl chloride, polyamides, polyimides, polyethers, polyesters, polyphenylene sulphide (PPS) and/or polycarbonates. It is possible to use a single thermoplastic, or else a combination of various thermoplastics. Preference is given to the use of polyvinyl chloride (PVC), and it has been found to be useful to use 10-50 parts by weight of polyvinyl chloride based on 100 parts by weight of the nitrile rubber component 1).

The inventive mixtures may comprise one or more further additives customary in the rubber industry.

It is possible to add halogenated compounds as a further component. These have accelerating action. However, in the choice of the proportion of halogenated constituents—for instance in the form of flame-retardant plasticizers—it should be ensured that no premature vulcanization occurs. Small amounts, however, are an option as activators for halogen-free resols. A suitable example is the addition of 5-10 phr polychloroprene.

It is additionally possible to add one or more ageing stabilizers. In the choice of the ageing stabilizer, it should be ensured that one which does not deactivate the resol component is used. Ageing stabilizers based on amines, which can lead to deactivation of the resol component, for example TMQ or MMBI, are not preferred. The use of diphenylamine derivatives is possible if minor limitations in the properties can be accepted. Preference is given to the use of phenolic ageing stabilizers. These have good efficacy and do not disrupt crosslinking. Suitable examples are bisphenols. It has been found to be useful to use 1-10 phr, preferably 2-5 phr and more preferably 3-4 phr of these.

The use of metal oxides is undesirable. Preferably, the inventive compositions do not comprise any metal oxides, for example zinc oxides are superfluous. Nor should other metal salts, for example tin(II) chloride, which are used in other cases as an activator for "resin crosslinking", be present with preference as a constituent in the inventive compositions, since there can be a reaction with the carboxyl groups of nitrile robber, analogously to zinc oxide. Nor is the addition of epoxide-containing compounds preferable, for example in the form of epoxidized soybean oil as a plasticizer or in the form of silanes whose side chains have epoxy groups, since there can be reactions with phenols to give phenyl ether derivatives.

Production of the Vulcanizable Composition:

The invention further provides for the production of the inventive compositions by mixing of components (1), (2) and (3) and of the further components optionally present. This mixing operation can be performed in all mixing units customary in the rubber industry, for example internal mixers or rollers. The sequence of metered addition can be determined without any problem by the person skilled in the art through suitable tests.

By way of example, two variants for the possible procedure are described hereinafter:

Process A: Production in an Internal Mixer

Preference is given to internal mixers with "intermeshing" rotor geometry.

At the start time, the internal mixer is charged with the nitrile rubber containing carboxyl groups in bale form, and the bales are comminuted. After a suitable mixing period (e.g. 45 sec), the silicatic filler and the silane of the general formula (I) are added. The mixing is effected under temperature control, with the proviso that the mixture remains at a temperature in the range from 130 to 150° C. for a suitable time (e.g. at least 1 minute). After a further suitable mixing period (e.g. 2 minutes 15 seconds), the further mixture constituents are added, such as optionally the halogenated activator, stearic acid, antioxidants, plasticizers, white pigments (e.g. titanium dioxide), dyes and other processing actives. After a further suitable mixing period (e.g. 1 minute), the internal mixer is vented and the shaft is cleaned. After a further suitable period (e.g. 3 minute), the internal mixer is emptied to obtain the vulcanizable mixture.

The resol component 2) is preferably added after the emptying of the internal mixer on a roll in a batch-off operation. Charging after about 4 min of mixing time in the internal miser is possible, for example, if the mixture temperature is below about 120° C. After cooling, the vulcanizable mixture is present. The mixtures thus produced can be assessed in a customary manner, for instance by Mooney viscosity, by Mooney scorch or by a rheometer test.

Process B: Production on a Roll

If rolls are used as mixing units, it is possible to proceed in an analogous manner and sequence in the metered addition. If it proves to be difficult to attain mixture temperatures above 130° C., it has been found to be useful to produce the inventive mixture through use of silicatic fillers already modified with silanes of the general formula (I).

Performance of the Vulcanization of the Inventive Composition

The invention further provides the process for producing vulcanizates by subjecting the inventive composition to vulcanization, preferably at elevated temperature.

For this purpose, the vulcanizable mixture is processed further with calenders, rolls or extruders. The preformed mass is then vulcanized in presses, autoclaves, hot air systems or in what are called automatic mat vulcanization systems ("Auma"), and useful temperatures have been found to be in the range from 120° C. to 200° C., preferably 140° C. to 190° C. Further processing to give moulded articles in an injection moulding process is also possible.

The invention further provides the vulcanizates thus obtainable. The vulcanizates may take the form of moulded articles, which can be used, for example, as drive belts, rolls, protective sheets, shoe components, inter alia. The invention thus also provides for these uses of the inventive vulcanizates.

EXAMPLES

I Feedstocks

The nitrile rubbers containing carboxyl groups used were the nitrile rubbers containing carboxyl groups specified in Table 1 below:

TABLE 1

Nitrile rubbers containing carboxyl groups used (component 1) (commercial products from Lanxess Deutschland GmbH)

| XNBR (component 1) | Acrylonitrile content (% by wt.) | Type of carboxylic acid termonomer | Content of carboxylic acid monomer in XNBR (% by wt.) | Mooney viscosity ML 1 + 4 @ 100° C. |
|---|---|---|---|---|
| Krynac ® X 160 | 32.5 ± 1.5 | dicarboxylic acid | 1 | 58 |
| Krynac ® X 146 | 32.5 ± 1.5 | dicarboxylic acid | 1 | 45 |
| Krynac ® X 740 | 26.5 ± 1.5 | monocarboxylic acid | 7 | 38 |
| Krynac ® X 750 | 27 ± 1.5 | monocarboxylic acid | 7 | 47 |

The resols used in the examples are summarized in Table

TABLE 2

Resols used (component 2) (commercial products from SI Group, Inc. 2750 B Road, Schenectady, NY 12308, USA)

| Resol (component 2) | Trade name* | Melting// softening temperature [° C.] | Methylol content [%] | Bromine content [%] |
|---|---|---|---|---|
| Alkylphenol resin | SP 1045H | 60-66// not relevant | 5-9 | 0 |
| Brominated octylphenol resin with methylol groups | SF 1055 | 140-168// 785-95 | 10-15 | 3.6-4 |

The silanes used in the examples, and the silicatic filler modified with a silane, are summarized in Table 3.

TABLE 3

Silanes and silane-modified silicates used (component 3) (commercial products from Evonik Industries AG)

| Trade name | | Chemical name, source |
|---|---|---|
| Dynasylan ® OCTEO | inventive | octyltriethoxysilane |
| Dynasylan ® VTEO | inventive | vinyltriethoxysilane |
| Dynasylan ® AMEO | non-inventive | 3-aminopropyltriethoxysilane |
| Dynasylan ® GLYEO | non-inventive | 3-glycidyloxypropyltriethoxysilane |
| Si 69 | inventive | bis(triethoxysilylpropyl) tetrasulphide |
| Coupsil ® 8113 PV | inventive | Si 69-modified precipitated silica Ultrasil ® VN3 (12.7 parts by weight to 100 parts by weight) |
| Aerosil ® 8200 | inventive | hexamethylenedisilazane-modified fumed silica |

Further feedstocks used in the examples which follow were as follows:

| Aflux ® 25 | combination of isoalkanes with fatty acids (lubricant, Rheinchemie Rheinau GmbH) |

-continued

| | |
|---|---|
| Baypren ® 210 | poly(2-chlorobuta-1,3-diene) with Mooney viscosity ML 1 + 4 @ 100° C. = 43; (Lanxess Deutschland GmbH) |
| Edenor ® C1898-100 | stearic acid (BASF AG) |
| Ground sulphur, 90/95 Chance | double-refined, soluble elemental sulphur having a purity of min. 99.9%, converted to paste with bitumen, oil or silica (Avokal GmbH) |
| Mesamoll ® | alkylsulphonic esters of phenol (plasticizer; Lanxess Deutschland GmbH) |
| Oppasin Blue 6900 | organic pigment; indanthrone blue (BASF AG) |
| Oppasin Green 8730 | Cu-phthalocyanine, halogenated (BASF AG) |
| Oppasin Orange 3050 | pyrazolone orange (BASF AG) |
| Oppasin Rubine 4630 | BON-Rubine 4B, Ca lake (BASF AG) |
| Perbunan ® 2845F | acrylonitrile-butadiene rubber (Mooney viscosity ML 1 + 4 @ 100° C. = 45; acrylonitrile content 28% by wt.) (Lanxess Deutschland GmbH) |
| Tronox ® R-U-5 | titanium dioxide (filler) |
| Vulcazit DM/C | di(benzothiazol-2-yl) disulphide (MBTS) |
| Vulkalsil ® S | precipitated silicate with a BET surface area: 160-200 m²/g, Lanxess Deutschland GmbH) (component 3) |
| Vulkanox ® HS/LG | 2,2,4-trimethyl-1,2-dihydroquinoline (antioxidant; Lanxess Deutschland GmbH) |
| Vulkanox ® MB2/MG | 4- and 5-methyl-2-mercaptobenzimidazole (MMBI) (antioxidant; Lanxess Deutschland GmbH) |
| Vulkanox ® BKF | 2,2'-methylenebis(4-methyl-6-cert-butyl-phenol) (antioxidant, Rheinchemie Rheinau GmbH) |
| Zinkoxid aktiv ® | zinc oxide (Lanxess Deutschland GmbH) |

II General Description of the Production of the Vulcanizable Mixtures

The mixtures were produced in internal mixers with intermeshing rotor geometry, having capacity 1.5 l to 5 l: The mixture constituents, the amounts thereof and any different settings of the internal mixer according to the example are listed in the later tables.
Mixing Procedure:
0 min: polymer—ram up,
1 min: ram down, open internal mixer
  charge with the silicate and the particular silane
1 min, 10 sec: ram up
until
4 min: mixing, temperature of >140° C. attained after about 2 min. By adjusting the speed it is ensured that the temperature does not exceed 150° C.
4 min: ram down, open internal mixer,
  charge with the remaining mixture constituents apart from the resol
4 min, 15 sec: ram up
4 min, 30 sec: empty
This was followed by cooling on the roll and mixing-in of the particular resol.
Settings for the Internal Mixer:
Speed: variable
Ram pressure: 5 bar
Temperature: 40° C.
Fill level: 12%
The roll temperature was 40° C.

III Characterization of the Mixtures and of the Vulcanization Profile, and Also of the Vulcanizates Obtained The characterization of the mixtures and of the vulcanization profile, and also of the vulcanizates obtained, was effected by the methods of the standards cited in the table which follows.

TABLE 4

| Methods | |
|---|---|
| Characterization: | Standard |
| Tensile test (ISO dumbbell No.2) | DIN 53504 |
| Shore A hardness | DIN 53519-1 |
| Resilience | DIN 53612 |
| Abrasion | ASTM D 5963 |
| Compression set | DIN ISO 815 |
| Torque/vulcanization characteristics | ASTM D 5289 in a rheometer at 170° C. for 60 min. |
| Mooney viscosity ML 1 + 4 @ 100° C. | ASTM D 1646 |

The abbreviations given in the tables which follow have the following meanings:
Smax maximum on the vulcameter display
$t_5$ vulcanization time at which 5% of the final conversion has been attained
$t_{10}$ vulcanization time at which 10% of the final conversion has been attained
$t_{90}$ vulcanization time at which 90% of the final conversion has been attained
TS tensile strength
EB elongation at break
M50 stress at 50% elongation IV Examples IV.1 Examples 1*-3*, 6* and 7* (Inventive) and Comparative Examples 4 and 5

The mixtures used in Examples 1*-3* and in Comparative Examples 4 and 5 are summarized in Table 5.

TABLE 5

Mixture composition; Examples 1*-3*, 6* and 7*; Comparative Examples 4 and 5

| | Examples | | | | | | |
|---|---|---|---|---|---|---|---|
| | 1* | 2* | 3* | 4 | 5 | 6* | 7* |
| KRYNAC ® X 750 | 100 | 100 | 100 | 100 | 100 | 100 | 100 |
| TRONOX ® R-U-5 | 5 | 5 | 5 | 5 | 5 | 5 | 5 |
| VULKASIL ® S | 30 | 30 | 30 | 30 | 30 | | |
| COUPSIL ® 8113 PV | | | | | | 30 | |
| AEROSIL ® R 8200 | | | | | | | 30 |
| MESAMOLL | 10 | 10 | 10 | 10 | 10 | 10 | 10 |
| SI 69 | 5 | | | | | | |
| DYNASYLAN ® OCTEO | | | | 5 | | | |
| DYNASYLAN ® VTEO | | 5 | | | | | |
| DYNASYLAN ® AMEO | | | | | 5 | | |

TABLE 5-continued

Mixture composition; Examples1*-3*, 6* and 7*; Comparative Examples 4 and5

|  |  | Examples | | | | | | |
|---|---|---|---|---|---|---|---|---|
|  |  | 1* | 2* | 3* | 4 | 5 | 6* | 7* |
| DYNASYLAN ® GLYEO |  |  |  |  | 5 |  |  |  |
| SP-1055 |  | 10 | 10 | 10 | 10 | 10 | 10 | 10 |
| Total | phr | 160 | 160 | 160 | 160 | 160 | 155 | 155 |
| Density | g/cm³ | 1.14 | 1.132 | 1.131 | 1.136 | 1.134 | 1.141 | 1.141 |

Figure 2:
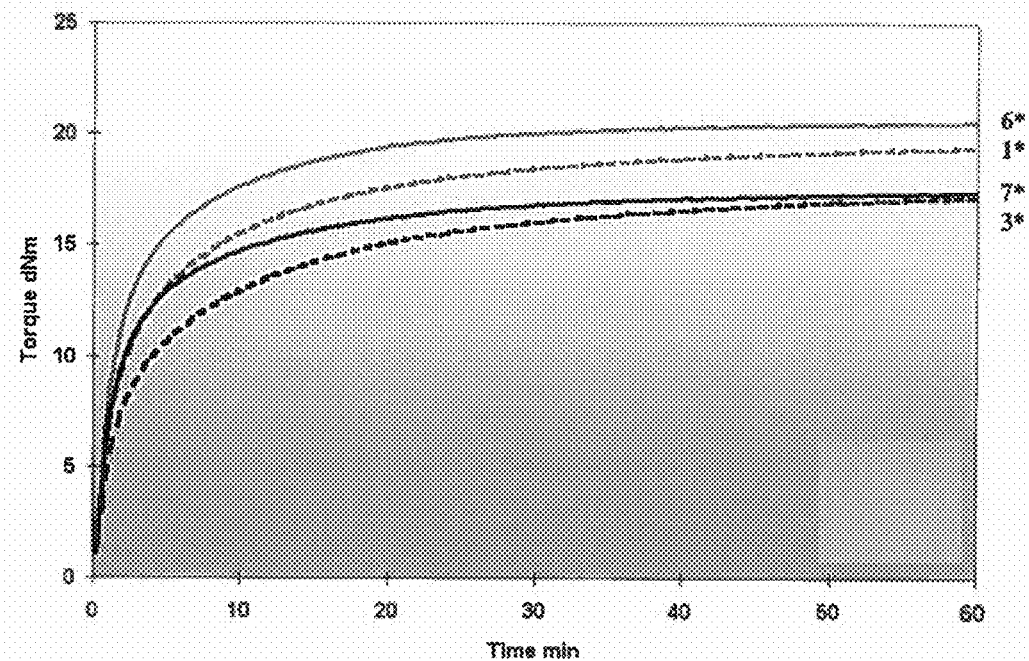

The dependence of the torque as a function of time is plotted in FIG. 1 and FIG. 2. It is apparent from FIG. 1 that the mixtures produced using non-inventive silanes (Dynasylan® AMEO or Dynasylan® GLYEO) vulcanize only very slowly. The final torque is likewise inadequate; crosslinking is thus inadequate. With inventive silanes (Si 69 or Dynasylan VTEO or OCTEO), in contrast, high final torques are achieved, and rapid commencement of vulcanization is achieved with simultaneously adequate scorch stability.

IV.2 Comparative Examples 8-12 and Examples 13* and 14* (Inventive)

The mixtures used in Comparative Examples 8-12 and Inventive Examples 13* and 14* are summarized in Table 6.

TABLE 6

Mixture compositions of Examples 8-12 (comparative) and 13*-14* (inventive)

|  | Example | | | | | | |
|---|---|---|---|---|---|---|---|
|  | 8 | 9 | 10 | 11 | 12 | 13* | 14* |
| PERBUNAN ® 2845 F | 100 |  |  |  |  |  |  |
| KRYNAC ® X 750 |  | 100 |  | 100 |  | 100 |  |
| KRYNAC ® X 146 |  |  | 100 |  | 100 |  | 100 |
| KRYNAC ® X 740 |  |  |  |  |  |  |  |
| EDENOR ® C 18 98-100 | 0.5 |  |  |  |  | 0.5 | 0.5 |
| VULKASIL ® S | 50 | 30 | 30 | 30 | 30 | 30 | 30 |
| TRONOX ® R-U-5 | 5 | 5 | 5 | 5 | 5 | 5 | 5 |
| OPPASIN ® BLUE 6900 |  | 2 | 2 |  |  |  |  |
| OPPASIN ® GREEN 8710 |  |  |  | 2 | 2 |  |  |
| OPPASIN ® ORANGE 3050 |  |  |  |  |  | 2 | 2 |
| OPPASIN ® RUBINE 4630 |  |  |  |  |  |  |  |
| SI 69 | 5 | 5 | 5 |  |  | 5 | 5 |
| VULKANOX ® HS/LG | 1.5 | 1.5 | 1.5 |  |  |  |  |
| VULKANOX ® MB2/MG | 1.5 | 1.5 | 1.5 |  |  |  |  |
| VULKANOX ® BKF |  |  |  | 1.5 | 1.5 | 1.5 | 1.5 |
| MESAMOLL ® | 10 | 10 | 10 | 10 | 10 | 10 | 10 |
| BAYPREN ® 210 |  |  |  |  |  |  |  |
| SP 1045 H |  |  |  |  |  |  |  |
| SP-1055 |  |  |  | 10 | 10 | 10 | 10 |
| ZINKOXYD AKTIV | 3 | 3 | 3 |  |  |  |  |
| GROUND SULPHUR 90/95 CHANCE | 1.5 | 1.5 | 1.5 |  |  |  |  |
| VULKACIT ® D/C | 0.5 | 0.5 | 0.5 |  |  |  |  |
| VULKACIT ® DM/C | 1.5 | 1.5 | 1.5 |  |  |  |  |
| Total [phr] | 180 | 161.5 | 161.5 | 158.5 | 158.5 | 164 | 164 |
| Density g/cm³ | 1.213 | 1.164 | 1.147 | 1.138 | 1.121 | 1.135 | 1.119 |

The vulcanizable mixtures were produced according to the general instructions.

The characterization was effected by the methods specified in point I.

TABLE 7

Vulcanization profile and vulcanizate properties for Examples 8-12 (comparative) and 13*-14* (inventive)

|  |  | Vulcanization with ZnO/sulphur | | | Vulkasil ® S | | Vulkasil ® S Si 69 | |
| --- | --- | --- | --- | --- | --- | --- | --- | --- |
|  |  | 8 | 9 | 10 | 11 | 12 | 13* | 14* |
| Base polymer |  | Perbunan 2845 F | Krynac X 750 | Krynac X 146 | Krynac X 750 | Krynac X 146 | Krynac X 750 | Krynac X 146 |
| ML 1 + 4/100° C. | MU | 50 | 81 | 74 | 70 | 51 | 69 | 67 |
| | | | Rheometer 170° C./60 min | | | | | |
| Smax | dNm | 22 | 17 | 18 | 17 | 19 | 14 | 16 |
| $t_{10}$ | min | 1.2 | 0.7 | 0.9 | 0.8 | 2 | 0.8 | 2.2 |
| | | | Rheovulcameter flow | | | | | |
| Mould filling | % | 54 | 16 | 25 | 31 | 40 | 26 | 30 |
| Hardness | Shore A | 60 | 65 | 56 | 57 | 68 | 54 | 54 |
| | | | Stress-strain properties | | | | | |
| TS | MPa | 18.9 | 14.3 | 14 | 24.6 | 19.4 | 17.2 | 15.5 |
| EB | % | 375 | 255 | 300 | 565 | 535 | 395 | 345 |
| M50 | MPa | 1.3 | 1.8 | 1.3 | 1.3 | 1.3 | 1 | 1 |
| Abrasion | mm³ | 53 | 35 | 58 | 133 | 136 | 58 | 58 |
| | | | Compression set (CS) | | | | | |
| CS(168h/100° C.) | % | 40 | 44 | 39 | 51 | 38 | 39 | 30 |

It is apparent from Table 1 that the vulcanizates based on inventive mixtures feature a distinct improvement in compression set over mixtures which have been produced with conventional zinc oxide/sulphur crosslinking system, or with a silica filter but without the silane. This becomes evident if the compression set of Comparative Examples 9 and 11 is compared with that of Inventive Example 13*. The same applies to the comparison of Comparative Examples 10 and 12 with respect to Inventive Example 14*.

IV.3 Examples 15-19 and 21, 22, 25 (Inventive) and Comparative Examples 20, 23 and 24

The vulcanizable mixtures with the compositions specified in Table 8 were produced according to the general instructions given above. The characterization was effected by the methods specified in point I.

TABLE 8

Examples 15-19 and 21, 22, 25 (inventive) and Comparative Examples 20, 23, and 24

| | 15* | 16* | 17* | 18* | 19* | 20 | 21* | 22* | 23 | 24 | 25* |
| --- | --- | --- | --- | --- | --- | --- | --- | --- | --- | --- | --- |
| KRYNAC ® X 146 | 100 | 100 | 100 | 100 | 100 | 100 | 100 | 100 | 100 | 100 | 100 |
| TRONOX ® R-U-5 | 5 | 5 | 5 | 5 | 5 | 5 | 5 | 5 | 5 | 5 | 5 |
| VULKASIL ® S | 40 | 40 | 40 | 40 | 40 | 40 | 40 | 40 | 40 | 40 | |
| COUPSIL ® 8113 PV | | | | | | | | | | | 40 |
| SI 69 | 6 | 3 | 6 | 6 | 3 | | 1.5 | 3 | | | |
| MESAMOLL ® | 10 | 10 | 10 | 10 | 10 | 10 | 10 | 10 | 10 | 10 | 10 |
| AFLUX ® 25 | 2 | 2 | 2 | 2 | 2 | 2 | 2 | 2 | 2 | 2 | 2 |
| EDENOR ® C 8 98-100 | 0.5 | 0.5 | 0.5 | 0.5 | 0.5 | 0.5 | 0.5 | 0.5 | 0.5 | 0.5 | 0.5 |
| VULKANOX ® BKF | 2 | 2 | 2 | 2 | 2 | 2 | 2 | 2 | 2 | 2 | 2 |
| SP-1055 | 10 | 4 | 4 | 13 | 13 | 4 | 7 | 10 | 13 | 10 | 10 |
| Total phr | 175.5 | 166.5 | 169.5 | 178.5 | 175.5 | 163.5 | 168 | 172.5 | 172.5 | 169.5 | 169.5 |
| Density g/cm³ | 1.147 | 1.149 | 1.148 | 1.146 | 1.147 | 1.15 | 1.149 | 1.147 | 1.147 | 1.148 | 1.148 |

Settings for the Internal Mixer:

Speed: variable

Ram pressure: 8 bar

Temperature: 40° C.

Fill level: 70%

The roll temperature was 40° C.

For the vulcanizates produced from the mixtures according to Examples 15-19 and 21, 22, 25 (inventive) and Comparative Examples 20, 23 and 24, the properties listed in Table 9 were determined.

TABLE 9

Vulcanization profile and vulcanizate properties
Properties of the vulcanizable mixture

| | | 15* | 16* | 17* | 18* | 19* | 20 | 21* | 22* | 23 | 24 | 25* |
|---|---|---|---|---|---|---|---|---|---|---|---|---|
| ML 1 + 4/100° C. | MU | 58 | 60 | 54 | 57 | 61 | 82 | 61 | 58 | 61 | 68 | 70 |
| MSR | | 0.411 | 0.476 | 0.474 | 0.393 | 0.403 | 0.414 | 0.448 | 0.415 | 0.439 | 0.432 | 0.435 |
| Rel. decay @ 30 sec | % | 12.7 | 9.7 | 9.7 | 13.4 | 13.1 | 12.4 | 11.2 | 12.4 | 10.6 | 11.4 | 11.5 |
| after 3 d/40° C. hot-air ageing | | | | | | | | | | | | |
| ML 1 + 4/100° C. | MU | 83 | 73 | 68 | 81 | 81 | 83 | 76 | 80 | 70 | 75 | 87 |
| MSR | | 0.352 | 0.419 | 0.417 | 0.362 | 0.363 | 0.405 | 0.393 | 0.358 | 0.382 | 0.388 | 0.383 |
| Rel. decay @ 30 sec | % | 16.7 | 12.8 | 12.4 | 16.0 | 15.9 | 13.3 | 14.2 | 16.2 | 14.1 | 14.1 | 14.5 |
| MS-t5/120° C. | min | 11.3 | >45 | >45 | 10.0 | 10.8 | 15.6 | 16.0 | 12.2 | 6.5 | 6.7 | 7.3 |
| Monsanto—MDR 2000 E | | | | | | | | | | | | |
| Temperature | 190° C. | | | | | | | | | | | |
| Measurement time | 60 min | | | | | | | | | | | |
| Minimum torque | dNm | 1.6 | 1.2 | 1.2 | 1.8 | 1.6 | 2.8 | 1.5 | 1.5 | 1.9 | 2.2 | 1.8 |
| Maximum torque | dNm | 26.3 | 16.2 | 17.0 | 28.9 | 28.2 | 25.1 | 23.6 | 25.6 | 37.1 | 34.6 | 26.6 |
| Final torque | dNm | 26.3 | 16.2 | 17.0 | 28.9 | 28.2 | 25.1 | 23.6 | 25.6 | 37.1 | 34.6 | 26.6 |
| TS 1 | min | 0.6 | 1.0 | 0.9 | 0.5 | 0.6 | 0.5 | 0.7 | 0.6 | 0.4 | 0.4 | 0.5 |
| TS 2 | min | 0.8 | 1.5 | 1.5 | 0.7 | 0.7 | 0.8 | 0.9 | 0.8 | 0.5 | 0.6 | 0.6 |
| $t_{10}$ | min | 0.9 | 1.2 | 1.2 | 0.8 | 0.8 | 0.8 | 0.9 | 0.9 | 0.7 | 0.7 | 0.7 |
| $t_{25}$ | min | 1.5 | 2.5 | 2.7 | 1.4 | 1.4 | 1.6 | 1.6 | 1.5 | 1.2 | 1.2 | 1.1 |
| $t_{50}$ | min | 2.8 | 5.3 | 6.4 | 2.6 | 2.6 | 3.3 | 3.1 | 2.7 | 2.4 | 2.4 | 2.0 |
| $t_{70}$ | min | 4.6 | 9.6 | 11.9 | 4.1 | 4.1 | 6.1 | 5.0 | 4.3 | 4.3 | 4.2 | 3.3 |
| $t_{80}$ | min | 6.1 | 13.8 | 17.1 | 5.3 | 5.4 | 9.0 | 6.8 | 5.6 | 6.2 | 6.0 | 4.2 |
| $t_{90}$ | min | 9.2 | 22.9 | 27.4 | 7.6 | 7.6 | 16.7 | 10.6 | 8.1 | 10.4 | 10.0 | 6.0 |
| $t_{95}$ | min | 13.4 | 33.4 | 37.9 | 10.5 | 10.2 | 27.6 | 16.1 | 11.4 | 16.2 | 15.8 | 8.3 |
| tan δ end | | 0.01 | 0.06 | 0.05 | 0.01 | 0.01 | 0.07 | 0.02 | 0.01 | 0.02 | 0.02 | 0.01 |
| Vulcanizate properties | | | | | | | | | | | | |
| Crosslinking temperature | 190° C. | | | | | | | | | | | |
| Crosslinking time | min | | | | | | | | | | | |
| TS | MPa | 15.6 | 24.8 | 21.9 | 15.6 | 15.2 | 29.5 | 19.5 | 16.7 | 19.6 | 18.9 | 14.3 |
| EB | % | 229 | 529 | 467 | 194 | 190 | 732 | 335 | 239 | 329 | 391 | 230 |
| M50 | MPa | 1.9 | 1.5 | 1.5 | 2.2 | 2.4 | 1.5 | 1.9 | 1.9 | 2.4 | 2.1 | 1.9 |
| M100 | MPa | 3.9 | 2.3 | 2.4 | 5 | 5.4 | 2 | 3.6 | 4.1 | 4.4 | 3.5 | 3.9 |
| M300 | MPa | | 9.5 | 10.2 | | | 5 | 16.3 | | 17.1 | 12.3 | |
| Hardness | Shore A | 64 | 59 | 60 | 68 | 66 | 63 | 64 | 65 | 72 | 69 | 65 |
| Resilience | % | 34 | 37 | 39 | 30 | 27 | 35 | 31 | 30 | 23 | 27 | 29 |
| Abrasion | mm³ | 31 | 34 | 36 | 36 | 35 | 54 | 29 | 26 | 49 | 46 | 27 |
| Tear to ASTM D624C | N/mm | 26.8 | 32.1 | 32.1 | 24.5 | 23.3 | 35 | 29.3 | 24.8 | 28 | 31.4 | 23.6 |
| Compression set to DIN 53517 Sample A: | | | | | | | | | | | | |
| Deformation | 25% | | | | | | | | | | | |
| Temperature 23° C.; time: 70 h | | | | | | | | | | | | |
| CS | % | 3 | 12 | 10 | 2 | 2 | 16 | 6 | 3 | 8 | 9 | 3 |
| Temperature: 100° C.; time: 168 h | | | | | | | | | | | | |
| CS | % | 36 | 52 | 55 | 31 | 31 | 49 | 36 | 30 | 30 | 34 | 24 |

The invention claimed is:

1. Vulcanizable compositions comprising:
   (1) 100 parts by weight of a nitrile rubber having repeating units of at least one conjugated diene, at least one α,β-unsaturated nitrile, and at least one copolymerizable termonomer containing carboxyl group(s),
   (2) 1 to 50 parts by weight of at least one resol of the genera formula (II)

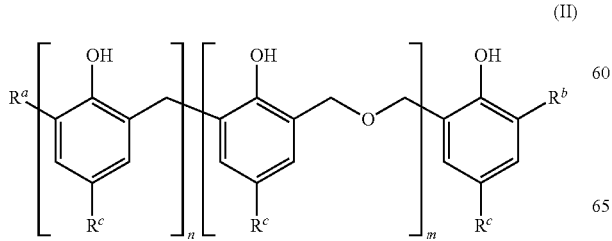

(II)

in which $R^a$ is H, —CH$_3$, —CH$_2$OH, or —CH$_2$Br, $R^b$ is —CH$_2$OH or —CH$_2$Br, $R^c$ is a straight-chain or branched C$_1$-C$_{15}$-alkyl radical, and n and m are the same or different and are each integers of 0 to 25, and (3) one of:
   (3a) 20 to 100 parts by weight of at least one silicatic filler and 1 to 20% by weight, based on the weight of the silicatic filler, of at least one silane of the general formula (I)

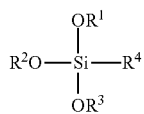

in which:
R$^1$, R$^2$ and R$^3$ are the same or different and are each straight-chain or branched C$_1$-C$_{25}$-alkyl radicals or R$^4$—C(=O)— where R$^4$ is straight-chain or branched C$_1$-C$_{25}$-alkyl, and R$^4$ represents straight-chain or branched C$_1$-C$_{14}$-alkyl radicals being saturated, or one or more times unsaturated and having no, one, two or more substituents selected from vinyl, —SH, substituted or unsubstituted phenyl, methacryloyloxy and isocyanato, or is —R$^5$—(S)$_x$—R$^5$—Si(OR$^1$)(OR$^2$)(OR$^3$) in which R$^1$, R$^2$ and R$^3$ are the same or different and are each as defined in formula (I), wherein R$^5$ is a straight-chain or branched C$_1$-C$_{14}$-alkylene radical and x is a number from 1 to 8, and (3b) 20 to 125 parts by weight of a silicatic filer modified with a silane.

2. The vulcanizable compositions according to claim 1, wherein the nitrile rubber comprises repeating units of at least one (C$_4$-C$_6$) conjugated diene, and repeating units of at least one (C$_3$-C$_5$)-α,β-unsaturated nitrile.

3. The vulcanizable compositions according to claim 1, wherein the carboxyl groups are selected from the group consisting of the α,β-unsaturated monocarboxylic acids, α,β-unsaturated dicarboxylic acids, anhydrides of α,β-unsaturated dicarboxylic acids, and monoesters of α,β-unsaturated dicarboxylic acids.

4. The vulcanizable compositions according to claim 1, wherein
at least a portion of R$^a$ and/or R$^b$ is CH$_2$OH, and
at least a portion of R$^a$ and/or R$^b$ is —CH$_2$Br,
such that the resols contain 4-20% by weight of the hydroxymethyl groups and 4-5 wt % bromine, based on the total weight of the resol.

5. The vulcanizable compositions according to claim 1, wherein:
R$^a$ is H or —CH$_2$OH,
R$^b$ is —CH$_2$OH,
R$^c$ is a straight-chain or branched C$_4$-C$_8$-alkyl radical, and
n and m are the same or different and are each integers of 0 to 15, and
the resol contains 4-20% by weight of the hydroxymethyl groups based on the total weight of the resol.

6. The vulcanizable compositions according to claim 1, wherein the silicatic filers comprise natural silicates, synthetic silicates, silicas, glass fibres, glass fibre products, or glass microbeads.

7. The vulcanizable compositions according to claim 1, wherein the silicatic fillers comprise precipitated or fumed silicas whose specific BET surface area to ISO 9277 is 5 to 1000 m$^2$/g.

8. The vulcanizable compositions according to claim 1, wherein:
R$^1$, R$^2$ and R$^3$ are the same or different and are each straight-chain or branched C$_1$-C$_8$-alkyl radicals, or R$^4$—C(=O)— where R$^4$ is a straight-chain or branched C$_1$-C$_{10}$-alkyl radical,
R$^4$ represents straight-chain or branched C$_1$-C$_{10}$-alkyl radicals being each saturated, or one or more times unsaturated and having no, one, two or more substituents selected from vinyl, —SH, substituted or unsubstituted phenyl, methacryloyloxy and isocyanato, or —R$^5$—(S)$_x$—R$^5$—Si(OR$^1$)(OR$^2$)(OR$^3$) in which R$^1$, R$^2$ and R$^3$ are the same or different and are each as defined in formula (I), wherein R$^5$ is a straight-chain or branched C$_1$-C$_5$-alkylene radical and x is a number from 1 to 8, and
the silicatic filer modified with a silane comprises a silicatic filler already modified with a silane of the general formula (I) in which R$^1$, R$^2$, R$^3$ and R$^4$ are each defined as specified.

9. The vulcanizable compositions according to claim 1, wherein the silane comprises at least one silane selected from the group of octyltriethoxysilane, vinyltriethoxysilane and bis(triethoxysilylpropyl) oligosulphides.

10. The vulcanizable compositions according to claim 1, additionally comprising
(4) one or more further polymers selected from the group consisting of rubbers, nitrile rubber, hydrogenated nitrile rubber, ethylene-vinyl acetate copolymer, ethylene-propylene-diene monomer rubber, ethylene-acrylate rubber, acrylate rubbers, fluoro rubbers, chloroprene rubbers, chlorinated polyethylene (CM), thermoplastic, polyamides, polyimides, polyethers, polyesters, polyphenylene sulphide (PPS), and polycarbonates, and any mixtures thereof.

11. The vulcanizable compositions according to claim 1, additionally comprising
(5) halogen-containing compounds in amounts of 5-10 parts by weight per 100 parts by weight of component (1), and
(6) no, one, or more than one further rubber additive.

12. A process for preparing the vulcanizable compositions according to claim 1, the process comprising mixing components (1), (2) and (3), and optionally any of:
component (4) one or more further polymers selected from the group consisting of rubbers, nitrile rubber, hydrogenated nitrile rubber, ethylene-vinyl acetate copolymer, ethylene-propylene-diene monomer rubber, ethylene-acrylate rubber, acylate rubbers, fluoro rubbers, chloroprene rubbers, chlorinated polyethylene (CM), thermoplastics, polyamides, polyimides, polyesters, polyesters, polyphenylene sulphide (PPS), and polycarbonate, and any mixtures thereof,
component (5) halogen-containing compounds in amounts of 5-10 parts by weight per 100 parts by weight of component (1), and
component (6) no, one, or more than one further rubber additive.

13. A process for producing vulcanizates from compositions according to claim 1, the process comprising subjecting the vulcanizable compostions according to claim 1 to vulcanization.

14. The process according to claim 13, wherein the vulcanization is done at a vulcanization temperature of 120° C. to 200° C.

15. The vulcanizable compositions according to claim 1, wherein:
the nitrile rubber comprises repeating units of at least one (C$_4$-C$_6$) conjugated diene selected from the group consisting of 1,2-butadiene, 1,3-butadiene, isoprene, 2,3-dimethylbutadiene, piperylene, or mixtures thereof, and at least one (C$_3$-C$_5$)-α,β-unsaturated nitrile selected from the group consisting of acrylonitrile, methacrylonitrile, ethacrylonitrile or mixtures thereof;

the silicatic fillers comprise kaolin, talc, aluminium silicates, magnesium silicate, calcium silicate, monosilicic acid or the more water-deficient condensates thereof, glass fibres, glass fibre products, or glass microbeads, $R^1$, $R^2$ and $R^3$ are the same or different and are each methyl, ethyl, n-propyl or iso-propyl, or $R^4$—C(=O)— where $R^4$ is a straight-chain or branched $C_1$-$C_8$-alkyl radical;

$R^4$ is a straight-chain or branched $C_1$-$C_8$-alkyl radical being each saturated, or one or more times unsaturated and having no, one, two or more substituents selected from vinyl, —SH, substituted or unsubstituted phenyl, methacryloyloxy and isocyanato, or —$R^5$—$(S)_x$—$R^5$—Si$(OR^1)(OR^2)(OR^3)$ in which $R^1$, $R^2$ and $R^3$ are the same or different and are each as defined in formula (I), wherein $R^5$ is a straight-chain or branched $C_1$-$C_3$-alkylene radical and x is a number from 2 to 5; and the composition comprises:
100 parts by weight of the nitrile rubber,
3 to 15 parts by weight of the at least one resol, and
20 to 60 parts by weight of the at least one silicatic filler and 2 to 18% by weight, based on the weight of the silicatic filler, of the at least one silane.

16. A vulcanizable composition comprising:
100 parts by weight of a carboxylated nitrile rubber,
1 to 50 parts by weight of a resol of the general formula (II)

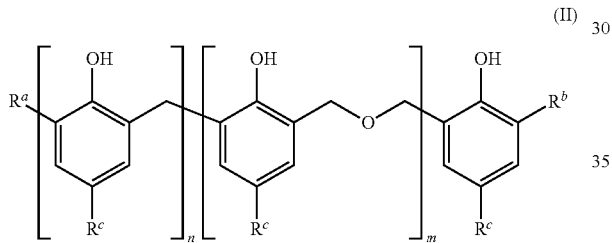

in which
$R^a$ is H, —$CH_3$, —$CH_2OH$ or —$CH_2Br$,
$R^b$ is —$CH_2OH$ or —$CH_2Br$,
$R^c$ is a straight-chain or branched $C_1$-$C_{15}$-alkyl radical, and
n and m are the same or different and are each integers of 0 to 25,
such that the resols contain 4-20% by weight of the hydroxymethyl groups and 4-5 wt % bromine, based on the total weight of the resol, 20 to 100 parts by weight of an inorganic silicatic filer, and
an organosilane that is unreactive towards the resol, wherein an amount of organosilane is 1 to 20% by weight based on the weight of the silicatic filler.

17. The composition according to claim 16, wherein:
the organosilane comprises a compound of the formula (I)

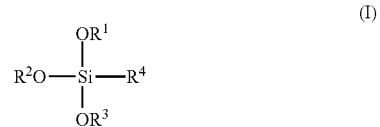

in which
$R^1$, $R^2$ and $R^3$ are the same or different and we each straight-chain or branched $C_1$-$C_{25}$-alkyl radicals or $R^4$—C(=O)— where $R^4$ is straight-chain or branched $C_1$-$C_{25}$-alkyl, and $R^4$ represents straight-chain or branched $C_1$-$C_{14}$-alkyl radicals being saturated, or one or more times unsaturated and having no, one, two or more substituents selected from vinyl, —SH, substituted or unsubstituted phenyl, methacryloyloxy and isocyanato, or is —$R^5$—$(S)_x$—$R^5$—Si$(OR^1)(OR^2)(OR^3)$ in which $R^1$, $R^2$ and $R^3$ are the same or different and are each as defined in formula (I), $R^5$ is a straight-chain or branched $C_1$-$C_{14}$-alkylene radical and x is a number from 1 to 8; and $R^a$ is H, —$CH_3$, —$CH_2OH$ or —$CH_2Br$,
$R^b$ is —$CH_2OH$ or —$CH_2Br$,
$R^c$ is tert-octyl radical or tert-butyl radical, and
n and m are the sane or different and are each integers of 0 to 15.

18. The composition according to claim 17, wherein:
the carboxylated nitrile rubber comprises:
40 to 89.9% by weight of repeating units of at least one conjugated diene,
10 to 59.9% by weight of repeating units of at least one α,β-unsaturated nitrile, and
0.1 to 20% by weight of repeating units of at least one copolymerizable termonomer containing carboxyl group(s); and
the silicatic fillers comprise natural silicates, synthetic silicates, silicas, glass fibres, glass fibre products, or glass microbeads.

* * * * *